OSCILLATOR

Filed March 19, 1958

INVENTOR.
ROBERT P. ADAMS
BY Arthur H. Swanson
ATTORNEY.

2,935,698

OSCILLATOR

Robert P. Adams, Pacific Palisades, Calif., assignor to Minneapolis-Honeywell Regulator Company, Minneapolis, Minn., a corporation of Delaware Application March 19, 1958, Serial No. 722,485

10 Claims. (Cl. 331—113)

The present invention generally pertains to that class of electrical apparatus known as oscillators. More specifically, the present invention is concerned with a type of oscillator which is adapted to oscillate at a frequency determined by the magnitude of a direct current signal.

A general object of the present invention is to provide a new and improved oscillator of the type described.

A specific object of the present invention is to provide an oscillator having a frequency of oscillation which is dependent upon the time required to charge a capacitor to a voltage determined by the breakdown of a Zener diode.

Another specific object of the present invention is to employ a transistor, connected as a switch, to discharge a capacitor periodically at a rate proportional to the capacitor charging voltage.

Still another specific object of the present invention is to provide a new and improved voltage to frequency transducer in which the output of a bi-stable circuit is employed to control the switching action of a transistor in response to a signal passed by a Zener diode when the breakdown voltage of the diode is exceeded.

Oscillators which are operative to oscillate at frequencies controlled by a voltage are particularly adapted for use in telemetering systems. In such systems, it is often desirable to convert a voltage, having a magnitude representative of a condition being measured or controlled, into a signal having a frequency proportional to the magnitude of that voltage. A signal thus produced can then be transmitted over suitable means of communication to a remote location where it can be retranslated into readily comprehensible reading of the condition being measured or controlled. Such oscillators thus provide means for reproducing at a convenient location measurements made at a remote point without a substantial loss of accuracy or dependence upon the quality of the transmission means employed.

Accordingly, it is a still further object of the present invention to provide an oscillator of the type described which is suitable for use in telemetering applications.

According to the present invention, a positive pulse of current derived from a capacitor charging circuit when the charge on the capacitor exceeds the breakdown voltage of the Zener diode is employed to trigger a one shot multivibrator circuit. The output of the multivibrator circuit is fed back to control a transistor switch, connected in shunt across the capacitor, causing the transistor to conduct and discharge the capacitor. The cycle is then repeated, the frequency of the pulses thus produced being proportional to the magnitude of the capacitor charging voltage.

A better understanding of the present invention may be had from the following description read with reference to the accompanying drawings of which:

Figure 1:
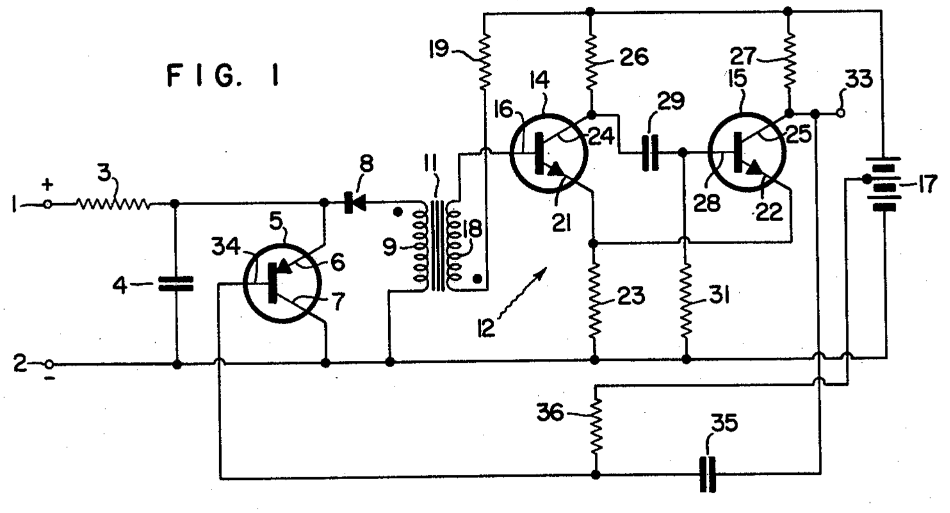
Fig. 1 is a circuit diagram of a preferred embodiment of the present invention.

Referring now to Fig. 1, the numerals 1 and 2 designate a pair of input terminals adapted to be connected to a source of direct current. As shown, a resistor 3 and a capacitor 4 are connected in series across the terminals 1 and 2. A pnp junction transistor 5, having the usual emitter, collector, and base electrodes, is connected as a synchronous switch across the capacitor 4. To this end, the emitter 6 of the transistor 5 is connected to the junction of the resistor 3 and the capacitor 4 and the collector 7 of the transistor 5 is connected to the other terminal of the capacitor 4. In addition to the transistor 5, the Zener diode 8 and a primary winding 9 of a coupling transformer 11 are connected in series across the capacitor 4. As shown, the Zener diode 8 is poled to be reversed biased by the charge on the capacitor 4.

The coupling transformer 11 is employed to couple the capacitor charging circuit just described to the input of a bi-stable or one-shot multivibrator circuit generally designated by the numeral 12. The multivibrator circuit 12 employs a pair of npn junction transistors 14 and 15 as its active elements. The transistors 14 and 15 have the usual emitter, collector, and base electrodes. As shown, the base 16 of the transistor 14 is connected to the positive terminal of a source of direct current, shown here as the battery 17, through a secondary winding 18 of the transformer 11 and a resistor 19. The emitter 21 of the transistor 14 and emitter 22 of the transistor 15 are connected together and through a common resistor 23 to the negative terminal of the battery 17. The collector 24 of the transistor 14 and the collector 25 of the transistor 15 are connected through similar resistors 26 and 27, respectively, to the positive terminal of the battery 17. In addition, the collector 24 of the transistor 14 is coupled to the base 28 of the transistor 15 by means of a capacitor 29. The base 28 of the transistor 15 is also connected to the negative terminal of the battery 17 by means of a resistor 31.

The output of the circuit of Fig. 1 is taken across the collector 25 of the transistor 15 by means of an output terminal 33. The collector 25 of the transistor 15 is also connected to the base 34 of the transistor 5 by means of the feedback path including a capacitor 35 and a resistor 36, connected between the capacitor 35 and a center tap on the battery 17.

In considering the operation of the circuit of Fig. 1 the characteristics of Zener diodes should be understood. In the forward direction of current flow, the resistance of these elements is low and current increases at the usual exponential rate with increases in the voltage applied across them. In the reverse direction, their resistance is high until the breakdown voltage is exceeded, whereupon, current through them is substantially independent of further increases in the voltage applied across them. As shown, the Zener diode 8 is poled to be reversed biased by the voltage across the capacitor 4. This being so, and assuming that the transistor 5 is biased in a nonconductive state so as not to constitute a short circuit across the capacitor 5, the capacitor 5 will charge at a rate proportional to the voltage across the terminals 1 and 2 until the breakdown voltage of the Zener diode is exceeded. When the breakdown voltage of the Zener diode 5 is exceeded, current will start flowing in the primary winding of the transformer 9 developing a negative signal in the base 16 of the transistor 14 in the one-shot multivibrator circuit 12.

The multivibrator circuit 12 is so arranged that when it is energized the transistor 14 will be biased in a highly conductive state by the positive voltage supplied to the base 16 by means of the resistor 19. Due to the common emitter resistor 23 and the coupling between the collector 24 of the transistor 14 and the base 28 of the transistor 15, the transistor 15 is bised to cut-off. In this state, the potential of the collector 25 of the transistor 15 is highly positive. This positive potential is applied to the base 34 of the transistor 5 by means of the capacitor 35. Since the transistor 5 is a pnp junction transistor, a positive signal applied to the base 34 maintains the transistor in a non-conductive state so that it is effectively an open switch connected in shunt across the capacitor 4.

Figure 2:
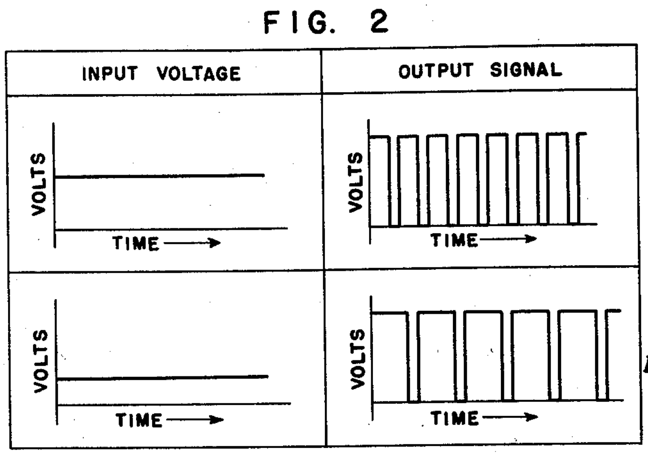
Fig. 2 is a table showing the output signal from the circuit of Fig. 1 for various input voltages.

A negative signal applied to the base 16 of the transistor 14 when the voltage across the capacitor 4 exceeds the breakdown voltage of the Zener diode 8 renders the transistor 14 in the multivibrator circuit 12 non-conductive. This raises the potential of the collector 24 of the transistor 14 applying a positive signal through the capacitor 29 to the base 28 of the transistor 15 making that transistor conductive. As the transistor 15 conducts, the collector 25 becomes rapidly less positive making the transistor 5 highly conductive which discharges the capacitor 4. When this occurs, the negative signal on the base 16 of the transistor 14 is lost and that transistor again becomes highly conductive cutting off the transistor 15. When the transistor 15 is cut off, the collector 25 again becomes highly positive making the transistor 5 non-conductive. The cycle is then repeated, the frequency of the pulses produced at the output terminal 33 being proportional to the magnitude of the capacitor charging voltage. Fig. 2 is a table showing the wave forms of the output signal from the circuit of the Fig. 1 for various input voltages.

Figure 3:
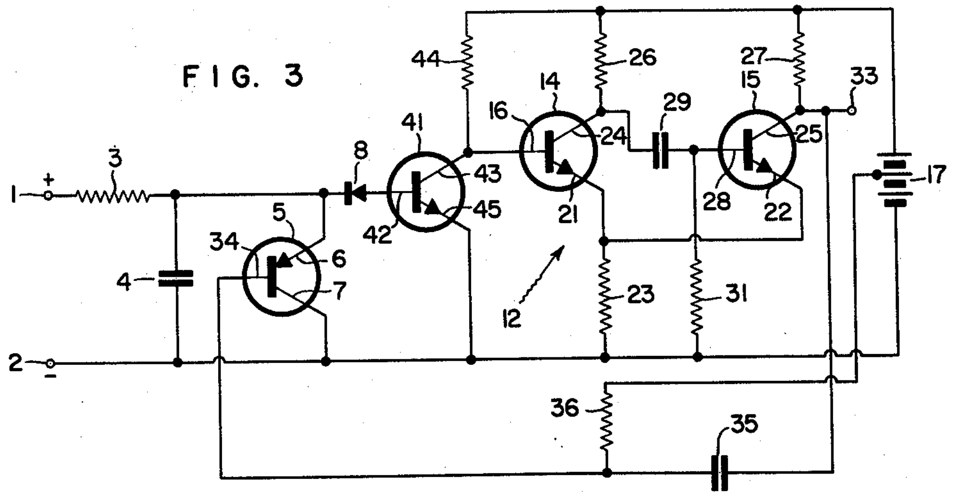
Fig. 3 is a circuit diagram showing a modification of the present invention shown in Fig. 1.

Referring now to Fig. 3, there is shown a circuit diagram of a modification of the present invention as shown in Fig. 1. Similar reference characters have been employed to designate components similar to those in Fig. 1 and these will not be described in detail. The circuit of Fig. 3 differs from the circuit of Fig. 1 in that the transistor 41 has been substituted for the coupling transformer 11. The transistor 41 is an npn junction transistor having the usual emitter, collector, and base electrodes. As shown, the base 42 of the transistor 41 is connected to the Zener diode 8. The collector 43 of the transistor 41 is connected by means of a resistor 44 to the positive terminal of the battery 17. The emitter 45 of the transistor 41 is connected to the negative terminal of the battery 17. The collector 43 of the transistor 41 is also direct coupled to the base 16 of the transistor 14 in the first stage of the multivibrator 12.

The transistor 41 provides a stage of amplification for the current passed by the Zener diode 8 when its breakdown voltage is exceeded. Until the breakdown voltage of the Zener diode 8 is exceeded, the transistor 41 is non-conductive and consequently the collector 43 is at a high potential causing the transistor 14 in the multivibrator circuit 12 to be highly conductive as is the case in the embodiment of the present invention shown in Fig. 1. The circuit of Fig. 3 operates in a manner similar to the circuit of Fig. 1. When the breakdown voltage of the Zener diode 8 is exceeded, current flows into the transistor 41 causing it to conduct. As the transistor 41 conducts, the potential of the collector electrode 43 becomes less positive cutting off the transistor 14. When the transistor 14 of the multivibrator circuit 12 is cut off, the transistor 15 becomes conductive. Due to the coupling between the collector 25 of the transistor 15 and the base 34 of the transistor 5, when the transistor 15 becomes conductive, the transistor 5 becomes conductive acting as a short circuit across the capacitor 4 discharging it. The circuit then resumes its normal state and the cycle is repeated at a frequency depending upon the magnitude of a capacitor charging voltage.

To assure linear operation of the circuits of Fig. 1 and Fig. 3, it is desirable that the voltage developed across the capacitor 4 at Zener breakdown be small compared with the input voltage. As stated hereinbefore, the circuits of Fig. 1 and Fig. 3 differ only in that the circuit of Fig. 3 includes a stage of amplification between the Zener diode and the input of the multivibrator circuit 12 rather than the transformer shown in Fig. 1. The inclusion of an amplifying stage rather than a transformer as the coupling means is desirable where the breakdown characteristics of the Zener diode are not sharply defined. It should be noted, that while the transistor 5 has been shown as a pnp junction transistor, and that the transistors 14 and 15 have been shown as npn junction transistors, that, with suitable changes in circuit polarities, transistors of opposite conductivity types could be employed.

Thus, there has been described a new and improved voltage controlled oscillator, having a frequency of oscillation which is dependent upon the magnitude of a voltage and which is particularly adapted for use in telemetering applications. Because this oscillator employs all semiconductor circuitry, characterized by long life and low power consumption, it is ideally suited for use at remote locations for providing signals having a frequency proportional to a voltage magnitude.

That which is claimed as new and which it is desired to secure by Letters Patent is:

1. In combination, a bi-stable circuit having an input and an output, a pair of terminals adapted to be connected to a source of direct current, a resistor, a capacitor, said resistor and capacitor being connected in series across said pair of terminals, a Zener diode, said Zener diode being connected in series between the junction of said resistor and said capacitor and the input of said multivibrator circuit, switching means connected in shunt across said capacitor, and feedback means connecting the output of said multivibrator circuit to said switching means to control the switching action of said switching means in accordance with the output of said multivibrator circuit.

2. In combination, a pair of terminals adapted to be connected to a source of direct current, a resistor, a capacitor said resistor and said capacitor being connected in series across said terminals, switching means connected across said capacitor, a bi-stable circuit having an input and an output, a Zener diode, said Zener diode being connected between the input of said bi-stable circuit and said capacitor in such a manner as to limit the charging of said capacitor, and circuit means connecting the output of said bi-stable circuit to said switching means to control the charging and discharging of said capacitor.

3. Apparatus as specified in claim 2 wherein said switching means comprises a transistor having its emitter-collector circuit connected across said capacitor.

4. A voltage controlled oscillator comprising, in combination, a capacitor charging circuit adapted to be connected to said control voltage, a transistor connected across said capacitor, a bi-stable circuit having an input and an output, a Zener diode connected between said capacitor and the input of said bi-stable circuit to limit charging of said capacitor, and feedback means connecting the output of said bi-stable circuit to said transistor to control the conductivity thereof.

5. A voltage controlled oscillator comprising, in combination, a capacitor charging circuit adapted to be connected to said control voltage, a first transistor connected across said capacitor, a bi-stable circuit having an input and an output, a Zener diode connected between said capacitor and the input of said bi-stable circuit to limit the charge on said capacitor, said bi-stable circuit comprising a second transistor means biased in full conduction in the absence of a signal input to said circuit and a third transistor biased by said second transistor to be non-conductive when said second transistor is conductive and biased to be conductive when said second transistor is non-conductive, and feedback means connecting said third transistor to said first transistor to control the conductivity thereof.

6. A voltage controlled oscillator comprising, in combination, a capacitor charging circuit adapted to be connected to said control voltage, a first transistor connected across said capacitor, a bi-stable circuit having an input and an output, a Zener diode connected between said capacitor and the input of said bi-stable circuit to be reverse biased by the charge on said capacitor, said bi-stable circuit comprising a second transistor, biasing means connected to said second transistor to bias it conductive in the absence of an input to said circuit, a third transistor, and means coupling said third transistor to said second transistor to bias said third transistor non-conductive when said second transistor is conductive and to bias said third transistor conductive when said second transistor is non-conductive, and feedback means connecting said third transistor to said first transistor to control the conductivity thereof.

7. In combination, a pair of terminals adapted to be connected to a source of direct current, a resistor and a capacitor connected in series across said terminals, a transistor having an emitter, a collector, and a base, the emitter-collector circuit of said transistor being connected in shunt across said capacitor, a bi-stable circuit having an input and an output, a Zener diode connected to said capacitor and poled to be reverse biased by the charge on said capacitor, an amplifying device coupling the Zener diode to the input of said bi-stable circuit, and a feedback circuit connecting the output of said bi-stable circuit to the base of said transistor.

8. An oscillator having a frequency of oscillation proportional to the magnitude of a direct current signal comprising, in combination, a pair of terminals adapted to be connected to said source, a resistor and a capacitor connected in series across said terminals, a transistor having an emitter, a collector, and a base, the emitter-collector circuit of said transistor being connected across said capacitor, a Zener diode connected to said capacitor and poled to be reverse biased by the charge on said capacitor, a bi-stable circuit having an input and an output, coupling means coupling said Zener diode to the input of said bi-stable circuit, and feedback means connecting the output of said bi-stable circuit to the base of said transistor, the output of said bi-stable circuit being such as to bias said transistor in a non-conductive state until the charge on the capacitor exceeds the breakdown voltage of said Zener diode and to bias said transistor momentarily conductive when the breakdown voltage of the Zener diode is exceeded by the charge on the capacitor.

9. Apparatus as specified in claim 8 wherein said coupling means is a transformer.

10. Apparatus as specified in claim 8 wherein said coupling means is an amplifying device.

References Cited in the file of this patent

UNITED STATES PATENTS 2,841,712 Hoge et al. ............... July 1, 1958